United States Patent Office 2,835,536
Patented May 20, 1958

2,835,536

PLANT FOR CONVEYING GRANULAR OR SOLID PRODUCTS, NOTABLY COAL SLUDGES, THROUGH HYDRAULIC MEANS

Maurice Marius Christille, Saint-Avold, France, assignor to Houilleres du Bassin de Lorraine, Merlebach, Moselle, France, a public establishment Application September 15, 1953, Serial No. 380,328

Claims priority, application France September 18, 1952

9 Claims. (Cl. 302—14)

This invention relates to a plant for conveying granular or fragmentary products, notably coal sludges, through hydraulic means.

When it is desired to transport a substance in the form of granules or finely divided particles, it is advantageous to use a water stream flowing at a velocity sufficient to carry along the smallest elements of this substance which are held in suspension. More particularly, if the granular substance is subjected to a washing treatment during a more complete cycle of operation, or if this substance is a component element of tailings from washing operations, conveying means using water as a vehicle seem to be preferable on account chiefly of the substantial economy which it makes it possible to achieve with respect to any other known systems of conveying similar materials.

Thus, coal sludges or particles carried along by residual water from coal washing plants appear to be particularly adapted for conveyance from these plants to the sludge extracting and conditioning plants in view of their subsequent use, for instance in the boiler house.

Usually the conveying of granular products through hydraulic means has been realized either by means of a total suspension of the granular products in the liquid vehicle or by drifting.

The total suspension of the granular products is only obtained for granules the greatest dimension of which is less than a predetermined limit, the density of which is less than another predetermined limit and for a circulation velocity greater than another predetermined limit. For example if the liquid vehicle is water, such a total suspension is obtained for granules having a diameter at the most equal to 3 mm. and a density at the most equal to 2.5, the circulation velocity of said suspended granules being comprised between 1.5 and 2 metres per second.

If the granules have a density greater than 2.5 and a diameter greater than 3 mm., said granules are conveyed in water by drifting, i. e. deposits are formed in the pipe-line and displaced by successive bounds under the action of water whatever the velocity of the latter. Said drifting induces a wear of the lower generatrices of the pipe-line and tends to clog said pipe-line, notably in the curves and in the sloped sections, in consequence of the accumulation of the granules on the motionless deposits existing in said curves and sloped sections.

The main object of the present invention is to provide conveying means for avoiding, on the one hand, such a wear of the lower generatrices of the pipe-line and, on the other hand, the risks of clogging which are unacceptable for any conveying system along great distances, measuring several kilometers for example.

According to the present invention the granular or fragmentary substance is suspended in a liquid vehicle, up to the optimum concentration value avoiding any sedimentation effect and dependent on the granule size and density, on the one hand, and on the shape and dimensions of the pipe-line through which this suspension is to be circulated, on the other hand, the stability of this suspension being constantly maintained from the place of mixing to the place of use.

Tests have shown that such a concentration must be at the most equal to 300 grams per liter, in the case of coal particles. Said concentration may be different for other materials.

The optimum concentration value is obtained by thickening a mixture of the liquid vehicle and of the granular product up to a concentration value greater than the optimum concentration value, then the thickened mixture is added with liquid vehicle in one or several steps for obtaining an homogeneous suspension the concentration of which is at the most equal to 300 grams per liter for coal particles. The thickening is preferably obtained by utilizing the classifying or grading method used in the mining.

The liquid vehicle consists of a liquid the density of which is determined according to the size and the density of the granular product, such a liquid being eventually a solution or an emulsion such as an argilliferous water. Further said liquid vehicle must have no physical or chemical action on the product to be conveyed, and no physical action (pH) or chemical action on the pipe-line and on the inner parts of the circulating pumps and of the mixing devices. In this way the stability of the suspension is obtained at the place of mixing and the wear of the pipe-line is reduced, even suppressed.

The pressure and velocity of the stream of circulating mixture between the place of mixing and the place of effective use of the granular material are adjusted according to the shape and dimensions of the hydraulic path, in order to keep the stability of the mixture to the proper degree.

Such an adjustment facilitates obtaining by simultaneous increase of pressure and velocity, on the one hand, an increase of the mixture output through the same pipe-line and, on the other hand, the destruction of any eventual deposit formed in the pipe-line.

For carrying out the method broadly disclosed hereinabove, the present invention has for other object a plant for conveying a granular or fragmentary substance, through hydraulic means, of the type comprising a mixing station for the substance to be conveyed and for the liquid vehicle, which mixing station is connected through a pumping station to a conveying pipe-line, characterised by the fact that the mixing station comprises a classifier acting as a thickener-decanter and fed with water containing particles of the substance to be conveyed in their original shape and dimensions in order to obtain a thickened aqueous mixture at a concentration value greater than the optimum concentration value for preventing any sedimentation, a regulating vat fed with water and with particles of the substance in their original shape and dimensions but of dimensions greater than those of said first particles, a complemental vat fed with water, and a constant-level preparatory vat fed with the substance to be conveyed by said classifier and said regulating vat and fed with water by the overflows of said classifier and regulating vat and by said complemental vat, that the pumping station comprises a plurality of one-stage centrifugal pumps connected to said preparatory vat, and on-off acting valves and conduits interconnecting said pumps according to any desired arrangement with a view to vary the output of the mixture delivered by said preparatory vat and to obtain a resumption of transport in the case where an accidental sedimentation occurs in the pipe-line, and that the conveying pipe-line comprises sloped portions having an angle of gradient at the most equal to the angle of repose of the substance to be conveyed on the material forming the pipe-line, taking into account the aqueous vehicle, and bent portions having radii so determined that, on the one hand, the resultant of the centrifugal force and of the gravity, taking into account the influence of the aqueous vehicle, is at the most equal to the gravity multiplied by 1.1 and, on the other hand, the contraction of the liquid vein induces no parting of said vein from the inner wall of said pipe-line.

The preparatory vat is fed from the classifier by means of a diaphragm pump. When the output is very large, hydro-ejectors may be substituted for the aforesaid diaphragm pump. In fact, hydro-ejectors provide a continuous output and a partly-regulated concentration of the mixture consisting of the aqueous vehicle and the granular substance which is introduced into the preparatory vat, thereby facilitating the obtainment of the desired concentration value.

Thus, the dimensions of the regulating vat, of the thickener-decanter and of the preparatory vat may be kept within relatively reduced limits, on account of:

(a) The constant output supplied by the hydro-ejector;

(b) The constant concentration value ensured by the operation of the same apparatus.

Thus the volumes of the regulating vat and of the preparatory vat may be as small as 2% to 2.5% of the hourly output of the conveying equipment.

According to an advantageous feature the pumps have a flat characteristic curve, in order to compensate any accidental clogging likely to occur in the transport conduit.

If a long-range transport installation is contemplated, these flat-curve pumps may be spaced along the transport line at relay stations and connected in series, in parallel or in series-parallel according to the characteristics of the transport pipe-line and the desired output.

Control and safety devices operating on the drainage principle, with return lines to the regulating and preparatory vats, are provided in the mixing station; the pipe-line is also provided with a number of dividing and draining valves according to the length and longitudinal profile of said pipe-line in order to drain the pipe-line if the circulation of the mixture is accidentally stopped or if a portion of said pipe-line must be repaired or changed.

The valves interposed in the pipe-line should ensure the highest continuity of the water conveying stream by preventing the formation of eddies likely to promote a rapid wear of said pipe-line.

Such valves which are well known in the art, define when open a passage the dimensions of which are equal to those of the pipe-line cross-section. However, in the present use they have an on-off action.

Finally, for given outputs, transport velocities, granule sizes, densities and shapes, there is a limit value for the concentration which, if overstepped, may be a cause of sedimentation and clogging in the pipe-line.

It is essential that the concentration value of the granular substance in the mixture transported may be known at any time; therefore, a special indicator is required.

The known methods of measuring concentration values for instance on the basis of the resistivity, involve the presence of electrodes or like feelers extending across the transport conduit, and are not satisfactory, because:

On the one hand, these electrodes or like feelers are constantly subjected to shocks and to the abrasive action from the particles of granular substance conveyed, so that within a more or less short time they fail to give reliable indications;

On the other hand, when these electrodes or feelers attain the limit of their mechanical wear, they are likely to break and be carried along in the pipe-line;

Besides, these electrodes or feelers may be attacked chemically by the granular substance and even by the liquid vehicle, the latter's character depending for example on the density and solubility of the granular substance to be conveyed.

According to this invention, the concentration value of the product conveyed in the pipe-line is measured through opacimetry by using gamma-rays.

A sound or optical relay warns the operator when the concentration attains its present limit value, and the variations in the concentration value with time may be followed by means of a recording device which, if combined with an output recording device, will make it possible to determine the tonnage transported per hour. Thus, with this arrangement, it is possible to watch and regulate the input of granular substances to be conveyed in order to keep the concentration value within satisfactory limits.

Control devices of the kind mentioned in the preceding paragraph may be spaced along the pipe-line to facilitate the detection of clogged points if they develop in said pipe-line, as a result of abnormal working conditions.

The accompanying drawings forming part of this invention illustrate diagrammatically by way of example one manner in which the invention may be carried out in the practice. In the drawings.

Figure 1:
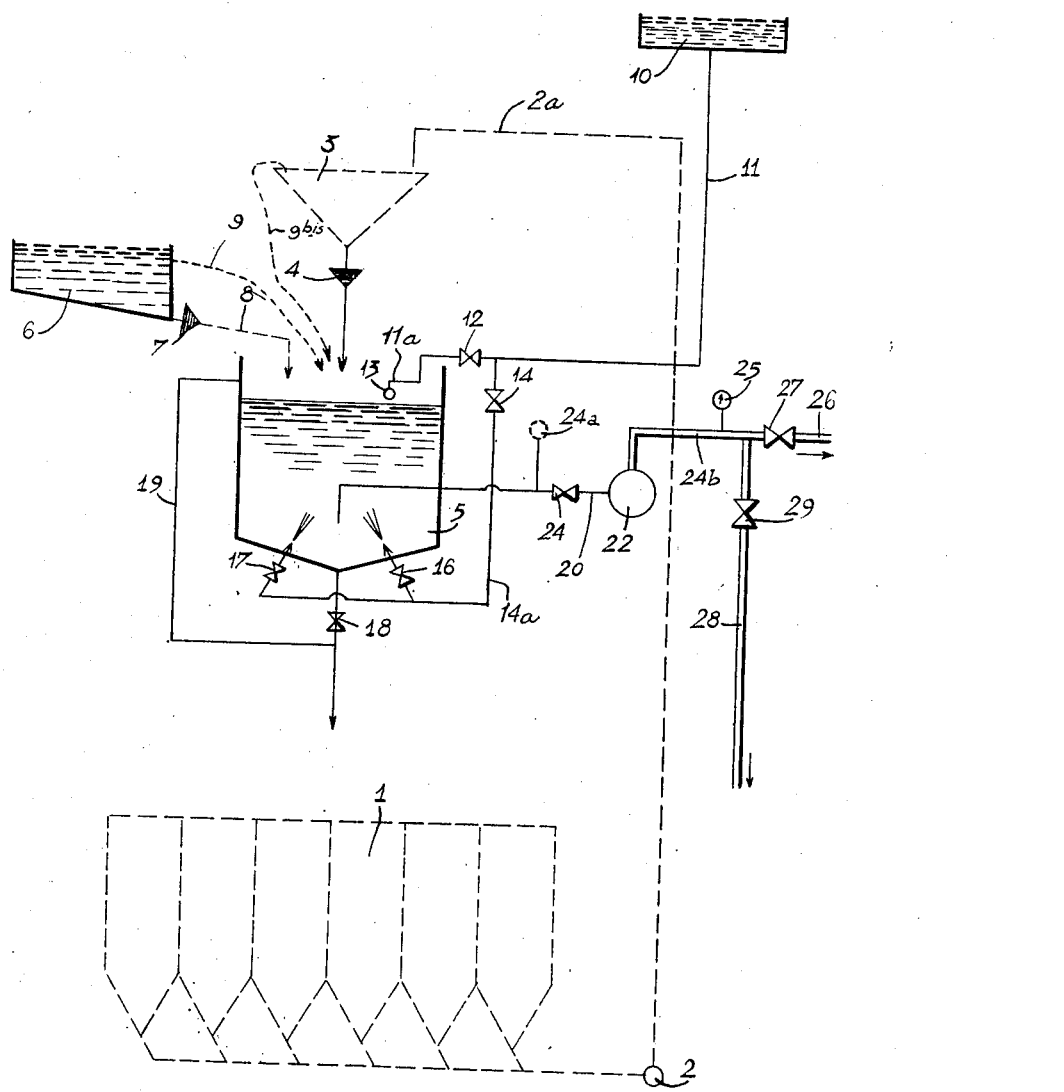
Fig. 1 is a diagram showing the combined plants for collecting the water and the sludges, on the one hand, and preparing the mixture, on the other hand.

Referring to the drawings, Figure 1 illustrates a set of chambers 1 having a conical-shaped bottom in which the residual water from the coal-washing plants is decanted. The purpose of these chambers, also called "Spitzkästen," is to retain the sludge particles of a size below 0.7 mm. to 1 mm. for example.

A pump 2 forces the sludge-loaded water through a conduit 2a into a thickener-decanter 3 (Fig. 1) or 43 (Fig. 3) formed by a conventional classifier or grader, for example of the type known under the trade-name of Dorr classifier. This thickener-decanter 3 feeds a constant-level preparatory vat 5 in which the mixture is to be prepared to the desired concentration value either by means of a diaphragm pump 4 (Fig. 1) or by means of a hydro-ejector 44 (Fig. 3) fed with pressure liquid through a conduit 41.

The granular substance accumulates in the lower portion of the thickener, for example on a height $h'$ varying only to a relatively small degree, as the input of this substance is approximately equal to the output delivered through the diaphragm pump 4 or hydro-ejector 44. In fact, the fluctuations caused by the incoming mixture are spread over an area increasing with the height of the deposit, the thickener 3, 43 being constructed in the form of a substantially conical hopper.

As the liquid fills the thickener 3 (Fig. 1), 43 (Fig. 3) up to the level of its overflow pipe 9b is (Fig. 1), 46 (Fig. 3) it will be seen that the mixture drawn by the diaphragm pump 4 (Fig. 1) or the hydro-ejector 44 (Fig. 3) has the following characteristics:

The output drawn is dependent on the head of liquid $h$ over the deposit, on the thickness $h'$ of this deposit and on the output of the diaphragm pump 4 or on the actual pressure of the driving fluid introduced at 41 when the hydro-ejector 44 is used.

As these three values are substantially constant, the output will also be constant. Moreover, the deposit of granular substance up to the height $h'$ contains a liquid volume equal to the gaps separating the granules; as a result, for a given granule size, the resulting mixture has a concentration value which is a direct function of the granule size itself, such a concentration being at the most equal to 500 grams per litre since the ratio between the gaps and the granules is at the most equal to 50.

Due to the action exerted by the driving fluid introduced through the nozzle 41 or by the pump 4, the concentrated mixture is carried along and in addition the liquid overlying it is subjected to a suction and filtrates through a layer of height $h'$. The final outcome of these combined actions is the development of a mixture having a substantially constantly pre-adjusted high concentration value.

However, in the case of large outputs the use of diaphragm pumps involving a pulsatory motion would shake the layer $h'$ and, as a consequence, the output and concentration values would become more irregular and require some compensating action in the preparatory vat.

For this purpose, the preparatory vat 5 may also be fed with fines of a gauge size ranging from 0.7 mm. to 1 mm., 0.7 mm. to 2 mm., 0.7 mm. to 3 mm., delivered from screens of respectively 1, 2, and 3 mm. mesh fed in turn with coal dust. These fines are collected in a regulating vat 6 and directed through a diaphragm pump 7 and a conduit 8 into the preparatory vat 5 in order to enable the granular substance concentration of the liquid vehicle to be raised to the desired value.

Figure 3:
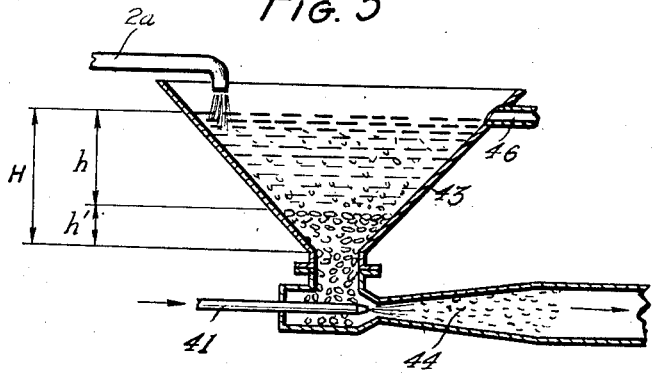
Fig. 3 is a vertical diagrammatical section showing a hydro-ejector mounted at the outlet of the classifier or grader acting as a thickener-decanter.

The preparatory vat 5 (Fig. 1) may also receive overflow water from the aforesaid regulating vat 6 through an overflow conduit 9, and also from the thickener-decanter 3 through another overflow conduit 9 bis (Fig. 1), 46 (Fig. 3).

A tank 10 containing complemental and stirring water supplies said preparatory vat 5 through a conduit 11 connected, on the one hand, with a branch pipe 11a provided with a valve 12 and leading into the upper portion of the preparatory vat 5 and, on the other hand, with another branch pipe 14a provided with a valve 14 leading through a plurality of nozzles equipped with valves 16, 17 into the lower portion of the same preparatory vat 5. The water fed to the lower portion of the preparatory vat stirs the mixture therein. A float-controlled valve 13 enables the upper portion of the preparatory vat 5 to be fed with water from the tank 10.

An overflow duct 19 keeps the liquid level to a constant height in the preparatory vat 5, as the latter is fed continuously. A cock 18 is provided for draining the water and sludges into the "Spitzkästen" 1.

The water supplied to the preparatory vat 5 through conduits 11a and 14a allows a decrease in the concentration value of the mixture escaping from the thickener-decanter 3 down to the desired value for obtaining a stable suspension of the granular product in the aqueous vehicle. The stability is obtained by the combined action of the aqueous vehicle and of the water supplying the preparatory vat and stirring the mixture in said vat.

For fine granules fed by the regulating vat 6, said regulating vat 6 feeds the preparatory vat 5 which in turn feeds the pumping station 22. For coarse particles fed by the regulating vat 6, said regulating vat is directly connected to conduit 24b, downstream of the pumping station 22, with a view to avoiding any deterioration of the pumps by said coarse particles, the concentration of the thickened mixture in the preparatory vat 5 being prepared at a value allowing to obtain the optimum concentration value without sedimentation into said conduit 24b, by feeding the pumping station 22 from the preparatory vat 5 only fed by the thickener-decanter 3 and by the tank 10.

The preparatory vat 5 is connected with the input side of a set of pumps 22 through a conduit controlled by a valve 24 and a concentration indicator 24a, to be described presently, is mounted on this conduit.

The set of pumps 22 deliver the mixture to a conduit 24b having mounted a pressure gauge 25 thereon; this conduit 24b has two branches, one branch is equipped with a valve 27 and supplies a pipe-line 26, and the other branch 28 is equipped with a similar valve 29 whereby the conduit may be drained directly into an emergency sludge-receiving tank if the circulation is accidentally stopped or the pipe-line damaged.

Figure 2:
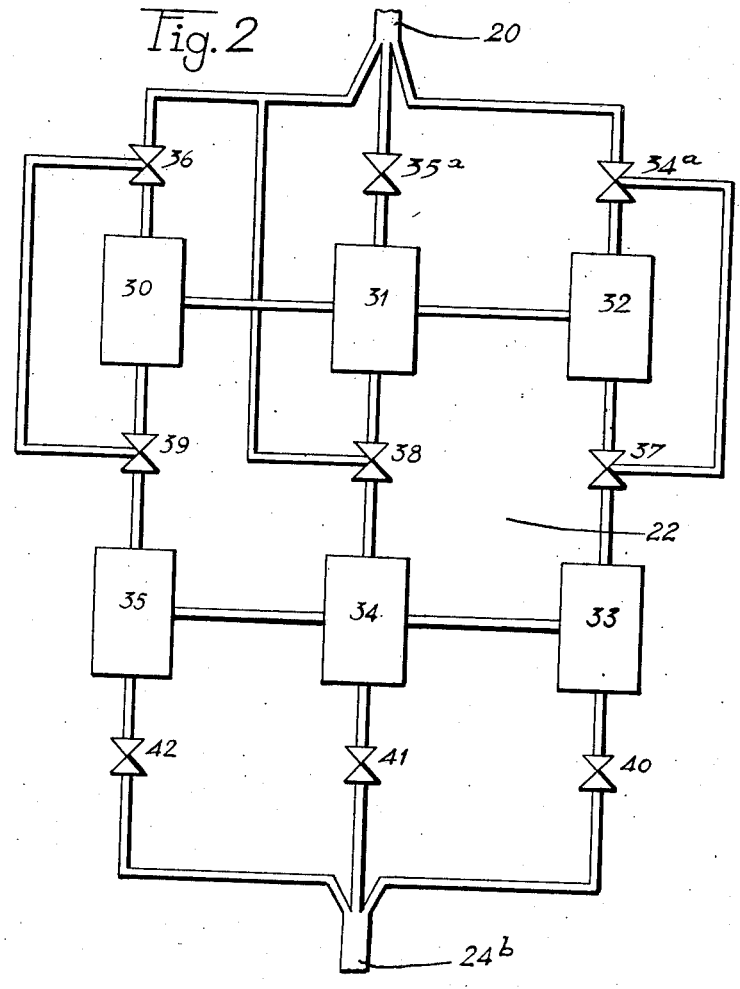
Fig. 2 is another diagram showing one possible arrangement of single stage pumps adapted to be interconnected in various fashions.

The pumping station 22 (Fig. 2) comprises a set of one-stage pumps such as 30, 31, 32, 33, 34, 35 which may be grouped or connected to operate either in series, thereby increasing the manometric heads, with unchanging outputs, or in parallel, the manometric heads remaining unchanged and the output being increased, or in series-parallel, by suitably actuating the control on-off acting valves 34a, 35a, 36, 37, 38, 39, 40, 41, 42. These pumps cause the mixture from conduit 20 to be circulated through the conduit 24b and subsequently through the pipe-line 26. These pumps operate under constant-load conditions due to the provision of the aforesaid means for maintaining the level in preparatory vat 5 to a constant height.

Figure 4:
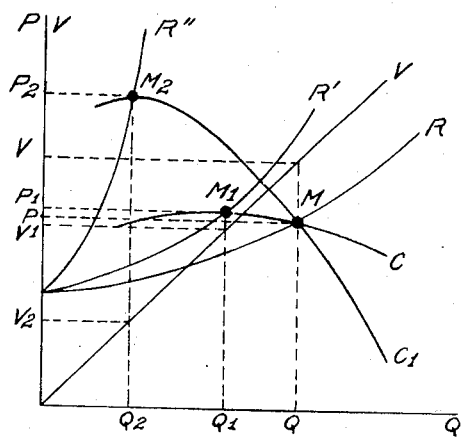
Fig. 4 is a typical operating diagram of the centrifugal pumps.

Regarding now the type of pump to be used (see Fig. 4), considering a pump having a flat characteristic curve such as C (the outputs being plotted in abscissae against the pressures and the velocities in ordinates), the normal operating point M being relatively close to the top point of this curve, an output Q will be obtained in the conduit, with a velocity V, the resistance curve of the conduit under normal operating conditions being shown at R.

If during abnormal conditions the circulating material forms a deposit in the pipe-line, its resistance curve becomes $R'$ and it will be seen that with a flat curve pump the point $R_1$, corresponding to the output $Q_1$ and velocity $V_1$, will be obtained; if the deposit increases, the pump will be unable to deliver the mixture. Now the difference between the pressures at M and $M_1$ is insignificant; as a result, when a deposit builds up, the operator is quickly warned by the fact that the output is discontinued and by the pulsatory pump running, before the deposit becomes too important and without having to relay on a manometric over-pressure warning device which might fail to operate.

At this time, the operator opens one of the valves 34a to 42 in order to couple in series one pump to the pump or the set of pumps then in action. The output as well as the pressure and the circulating velocity of the mixture in the pipe-line increases so that the building up deposit, the compactness of which is very small, is destroyed.

The combination of the pumps in series, in parallel, or in series-parallel, allows to vary at will the output of the mixture through the pipe-line without modification of its characteristics.

With a pump having a sloped characteristics curve such as $C_1$, for example, the point $M_2$ would be attained when the deposit corresponds to a resistance as defined by the curve $R''$; with a substantial pressure difference between M and $M_2$ the new output $Q_2$ would be much reduced with respect to Q and the conveying velocity would fall from V to $V_2$. Under these conditions, the volume of the deposit would have been increased due to the too slow circulation of the substance, and the compactness of the stopping plug would be increased by the resulting higher pressure in the direction of flow.

The pipe-line consists of relatively long sections such as steel tubes. Its path is designed to avoid sharp angles and bents in both horizontal and vertical planes, so that only large-radius curves are admitted in the pipe-line.

The radius of the bent portions in a horizontal view is so determined that the force exerted on the wall of a pipe-line bent section under the action of the centrifugal force and of the gravity, taking into account the influence of the liquid vehicle, is at the most equal to the force exerted on the wall of a pipe-line straight section under the action of the gravity multiplied by 1.1. Further said radius is determined so that the contraction of the liquid vein induces no parting of said vein from the inner wall of the pipe-line. Practically such a radius is comprised between 80 and 100 metres for a circulating velocity equal to 2 metres per second.

The sloped portions of the pipe-line in a vertical view have an angle of gradient at the most equal to the natural angle of repose or slipping slope of the granular product on the material forming the pipe-line, taking into account the liquid vehicle. Practically for the metallic pipes presently used the slope of said sections is at the most equal to 10%.

The external portions of the pipe-line and conduits are heat-insulated.

Safety devices may be provided to avoid water-hammering. The joints between successive sections may be welded. If concrete blocks are contemplated in circular joints in order to prevent the pipe-line from being distorted or otherwise displaced, rubber pads will preferably be provided between the concrete blocks and the pipe-line sheathing to avoid any undue wear of the latter. An appropriate continuous outer lining will protect the pipe-line from corrosion by atmospheric or other agents.

Finally, safety devices may also be provided for automatically opening the draining valves in the conduits leading to the "Spitzkästen" or like discharge tanks positioned at spaced intervals along the pipe-line in order to drain the pipe-line if the circulation of the mixture is accidentally stopped or if a portion of said line must be repaired or changed. A time-lag device will be provided to prevent these valves from operating in case of water-hammering. An automatic device of any known or suitable construction will stop the pumps when the liquid level in preparatory vat 5 falls below a predetermined level.

Figure 5:
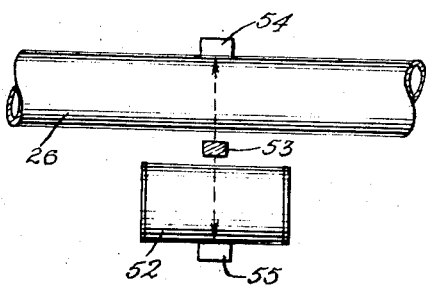
Fig. 5 is a differential opacimeter used for indicating the concentration value.

Finally, Fig. 5 shows the arrangement of a concentration indicator mounted on the pipe-line 26.

A source of gamma-rays 53 is positioned between the pipe-line 26 and a reference pipe section 52. The latter is exactly similar to the pipe-line 26 as to diameter and thickness, and it is filled with the same liquid vehicle as that used in said pipe-line 26, but without any granular substance therein. The mixture, consisting of the liquid vehicle and granular substance, is assumed to circulate through the pipe-line 26.

The source 53 emits radiations in the directions of the arrows through the pipe-line 26 and the reference pipe 52. The intensity of these radiations is measured by means of Geiger counters or like instruments giving the equivalent indications, positioned at 54 and 55 on either side of the pipe-line 26 and reference pipe 52 but opposite to the source 53. The higher the content of solid particles in the liquid vehicle, the lesser the radiations received at 54; by measuring the difference with respect to the radiations received at 55, the concentration value will be obtained, provided the various instruments utilized for this purpose are properly gaged; if the granular substance circulated were radio-active elements, the intensity of the radiations could be reversed.

A measure by direct opacimetry may be made by dispensing with the reference pipe 52 and the Geiger counter 55, the indications given by the Geiger counter 54 being compared to a predetermined table.

It is to be noted that the conveying system according to the present invention leads to very slight losses of pressure and expenditure of energy comparatively to those resulting from a displacement of the granules on the lower generatrices of the pipe-line as in the drifting process.

Of course, many modifications may be brought to the embodiments shown and described herein, as well as to the steps through which the method is carried out, without however departing from the scope of the invention as specified in the appended claims.

What I claim is:

1. A plant for conveying a granular or fragmentary substance, through hydraulic means, of the type comprising a mixing station for the substance to be conveyed and for the liquid vehicle, which mixing station is connected through a pumping station to a conveying pipe-line, wherein the mixing station comprises means for thickening a mixture of the liquid vehicle and of sludge particles of the substance in their original shape and dimensions, without transformation or crushing, up to a concentration value greater than the optimum concentration value for preventing any sedimentation, and means for adding said thickened mixture with liquid vehicle and with particles of the substance in their original shape and dimensions but of dimensions greater than those of said sludge particles in order to obtain an homogeneous suspension of said substance through said liquid vehicle at said optimum concentration value, wherein the pumping station comprises means for varying the output of the mixture delivered thereto by said mixing station while maintaining the concentration of said mixture at said optimum value, and wherein the conveying pipe-line comprises means for avoiding risks of clogging in its sloped portions and means for avoiding substantial wear of the conveying line in its bent portions.

2. A plant for conveying a granular or fragmentary substance, through hydraulic means, of the type comprising a mixing station for the substance to be conveyed and for the liquid vehicle, which mixing station is connected through a pumping station to a conveying pipe-line, wherein the mixing station comprises a thickener-decanter, means for feeding said thickener-decanter with water containing sludge particles of the substance to be conveyed in their original shape and dimensions, without transformation or crushing, means for extracting the thickened mixture obtained in said thickener-decanter, a regulating vat fed with water and with fines of the substance in their original shape and dimensions but of dimensions greater than those of said sludge particles, a diaphragm pump for extracting said fines from said regulating vat, a complemental vat fed with water, and a constant-level preparatory vat fed with the substance to be conveyed by said extracting means and said diaphragm pump and fed with water by the over-flows of said thickener-decanter and regulating vat and by said complemental vat, and means for imparting a stirring movement to the mixture contained in said preparatory vat under the action of the water fed thereto by said complemental vat; wherein the pumping station comprises a plurality of one-stage centrifugal pumps connected to said preparatory vat, having flat characteristic curve and operating in the vicinity of their optimum rating and efficiency, and on-off acting valves and conduits interconnectig said pumps according to any desired arrangement with a view to vary the output of the mixture delivered by said preparatory vat; and wherein the conveying pipe-line comprises sloped portions having an angle of gradient at the most equal to the angle of repose of the substance to be conveyed on the material forming the pipe-line, taking into account the aqueous vehicle, and bent portions having radii so determined that, on the one hand, the resultant of the centrifugal force and of the gravity, taking into account the influence of the aqueous vehicle, is at the most equal to the gravity multiplied by 1.1 and, on the other hand, the contraction of the liquid vein induces no parting of said vein from the inner wall of said pipe-line.

3. A plant according to claim 2, wherein the means for extracting the thickened mixture from the thickener-decanter comprises a diaphragm pump connected to said thickener-decanter.

4. A plant according to claim 2, wherein the means for extracting the thickened mixture from the thickener-decanter comprises a hydro-ejector connected to said thickener-decanter and a conduit feeding said hydro-ejector with pressure liquid.

5. A plant according to claim 2, further comprising control discharge tanks, safety devices positioned in the mixing and pumping stations for draining said stations to the discharge tanks, and valves inserted in the pipe-line for draining the latter to said discharge tanks.

6. A plant according to claim 5, wherein each valve of the pumping-station and of the pipe-line is on-off acting and defines when open a passage the dimensions of which are equal to the inner dimensions of the corresponding conduit or pipe-line.

7. A plant according to claim 2, wherein, the regulating vat is fed with coarse particles of the substance to be conveyed in their original shape and dimensions and wherein said regulating vat feeds downstream the pumps while the constant-level preparatory vat only fed by the extracting means and by the overflows feeds alone the preparatory vat with said substance, the thickened mixture prepared in the thickener-decanter having a concentration value allowing to obtain the optimum concentration value without sedimentation when said thickened mixture is mixed with said coarse particles.

8. A plant according to claim 2, further comprising means for indicating the concentration value.

9. A plant according to claim 8, wherein the concentration indicating means comprises a gamma-ray differential opacimeter having a reference pipe section exactly similar to the pipe-line as to diameter and thickness and filled with water, said pipe section being positioned parallelly to and in the vicinity of said pipe-line, a source of gamma-rays positioned between the pipe-line and said reference pipe section, and two Geiger counters positioned on either side of the pipe-line and reference pipe but opposite to the source of gamma-rays.

References Cited in the file of this patent

UNITED STATES PATENTS

| | | |
|---|---|---|
| 1,390,230 | Bates | Sept. 6, 1921 |
| 2,128,913 | Burk | Sept. 6, 1938 |
| 2,359,325 | McConnell | Oct. 3, 1944 |
| 2,554,583 | McFall | May 29, 1951 |
| 2,610,901 | Cross | Sept. 16, 1952 |
| 2,631,899 | Jullien | Mar. 17, 1953 |
| 2,672,370 | Jones | Mar. 16, 1954 |